US009305431B2

(12) United States Patent
Harris et al.

(10) Patent No.: US 9,305,431 B2
(45) Date of Patent: Apr. 5, 2016

(54) MULTI-PLAYER VIDEO POKER GAME AND METHOD THEREOF

(71) Applicants: Stephen M. Harris, Henderson, NV (US); Lawrence Vaughan, Las Vegas, NV (US)

(72) Inventors: Stephen M. Harris, Henderson, NV (US); Lawrence Vaughan, Las Vegas, NV (US)

(73) Assignee: Clownfish Entertainment LLC, Henderson, NV (US)

( * ) Notice: Subject to any disclaimer, the term of this patent is extended or adjusted under 35 U.S.C. 154(b) by 213 days.

(21) Appl. No.: 14/029,427

(22) Filed: Sep. 17, 2013

(65) Prior Publication Data

US 2015/0080080 A1 Mar. 19, 2015

(51) Int. Cl.
*G06F 17/00* (2006.01)
*G07F 17/32* (2006.01)

(52) U.S. Cl.
CPC ........ *G07F 17/3258* (2013.01); *G07F 17/3276* (2013.01); *G07F 17/3293* (2013.01)

(58) Field of Classification Search
USPC ................................ 463/9–13; 273/290–292
See application file for complete search history.

(56) References Cited

U.S. PATENT DOCUMENTS

| | | | | |
|---|---|---|---|---|
| 6,695,695 | B2 * | 2/2004 | Angel | 463/13 |
| 2003/0130023 | A1 * | 7/2003 | Angel | 463/13 |
| 2006/0084505 | A1 * | 4/2006 | Yoseloff et al. | 463/42 |
| 2012/0214567 | A1 * | 8/2012 | Snow | 463/13 |
| 2013/0217455 | A1 * | 8/2013 | Kennedy | G07F 17/3258 463/11 |
| 2015/0080079 | A1 * | 3/2015 | Harris | 463/13 |
| 2015/0087397 | A1 * | 3/2015 | Snow | 463/25 |
| 2016/0019755 | A1 * | 1/2016 | Kennedy | G07F 17/3258 463/11 |

* cited by examiner

*Primary Examiner* — Ronald Laneau

(74) *Attorney, Agent, or Firm* — Weiss & Moy; Jeffrey D. Moy

(57) ABSTRACT

A method of playing a video poker game comprising: inviting a plurality of players to play a video poker game, wherein each participating player plays an individual hand dealt from a separate standard 52 card deck for that participating player; placing a wager to begin play by each participating player, wherein there is at least two participating players; dealing five cards to each participating player face up from the separate standard 52 card deck for that participating player, wherein each participating player may one of: hold, fold, or replace any of the five cards; dealing replacement cards to each participating player from the separate standard 52 card deck for that participating player for each participating player who selects to replace any of the five card dealt to that participating player; determining if any of the participating players has a winning wager by verifying if remaining five cards of each participating player matches a poker hand stated on a pay table; and paying each participating player having a winning wager from the wager placed by each participating player.

15 Claims, 4 Drawing Sheets

MULTI-PLAYER VIDEO POKER GAME AND METHOD THEREOF

REFERENCE TO RELATED APPLICATIONS

This disclosure claims priority to U.S. Provisional Application Ser. No. 61/701,872 titled POKER GAME that was filed on Sep. 17, 2012 by Steve Harris and Lawrence Vaughn, which is hereby incorporated by reference in its entirety.

TECHNICAL FIELD

This disclosure generally relates to a poker game, and more, particularly, to a video poker game which may be played against other players where the wager and payouts are paid by the participating players minus a rake from each game.

BACKGROUND

The card game of poker, with its many variations, has become an extremely popular form of entertainment. Poker is now a common social pastime for both gamblers and non-gamblers. One popular four of poker is video poker. Video poker is a video game based on five-card draw poker. It is generally played on a computerized console similar in size to a slot machine. Presently, video poker games are individual games. Thus, each player plays a hand against the house. The player's hand is generally compared to a payout schedule located on the computerized console. If the player has a winning hand based on the payout schedule, the player wins and the house make the indicated payout. If the player has a losing hand based on the payout schedule, the house keeps the wager made by the player.

Unfortunately, presently, players cannot play against other players in present video poker consoles. If a video poker game would allow multiple players to play against one another, payouts could be made from opposing players and the house could take a rake based on the wagers from the players. It is therefore, desirable that a player would like to play against another player where the payout is paid from the opposing player and not from the house.

Therefore, it would be desirable to provide a card game and method that overcomes the above problems.

SUMMARY

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

A computer implemented video poker card game, the computer comprising a visual display device and a processor operably coupled to the display device and combined to display a card game, the processor programmed for a method comprising: inviting a plurality of players to play a video poker game, wherein each participating player plays an individual hand dealt from a separate standard 52 card deck for that participating player; placing a wager to begin play by each participating player, wherein there is at least two participating players; dealing five cards to each participating player face up from the separate standard 52 card deck for that participating player, wherein each participating player may one of: hold, fold, or replace any of the five cards; dealing replacement cards to each participating player from the separate standard 52 card deck for that participating player for each participating, player who selects to replace any of the five card dealt to that participating player; determining if any of the participating players has a winning wager by verifying if remaining five cards of each participating player matches a poker hand stated on a pay table; and paying each participating player having a winning wager from the wager placed by each participating player.

A game server has at least one processor and a memory operatively coupled to the at least one processor, the memory storing program instructions that when executed by the at least one processor causes the at least one processor to perform a method comprising: inviting a plurality of players to play a video poker game, wherein each participating player plays an individual hand dealt from a separate standard 52 card deck for that participating player; placing a wager to begin play by each participating player, wherein there is at least two participating players; dealing five cards to each participating player face up from the separate standard 52 card deck for that participating player, wherein each participating player may one of: hold, fold, or replace any of the five cards; dealing replacement cards to each participating player from the separate standard 52 card deck for that participating player for each participating player who selects to replace any of the five card dealt to that participating player; determining if any of the participating players has a winning wager by verifying if remaining five cards of each participating player matches a poker hand, stated on a pay table; and paying each participating player having a winning wager from the wager placed by each participating player.

A method of playing a video poker game comprising: inviting a plurality of players to play a video poker game, wherein each participating player plays an individual hand dealt from a separate standard 52 card deck for that participating player; placing a wager to begin play by each participating player, wherein there is at least two participating players; dealing five cards to each participating player face up from the separate standard 52 card deck for that participating player, wherein each participating player may one of: hold, fold, or replace any of the five cards; dealing replacement cards to each participating player from the separate standard 52 card deck for that participating player for each participating player who selects to replace any of the five card dealt to that participating player; deter mining if any of the participating players has a winning wager by verifying if remaining five cards of each participating player matches a poker hand stated on a pay table; and paying each participating player having a winning wager from the wager placed by each participating player.

The features, functions, and advantages can be achieved independently in various embodiments of the disclosure or may be combined in yet other embodiments.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
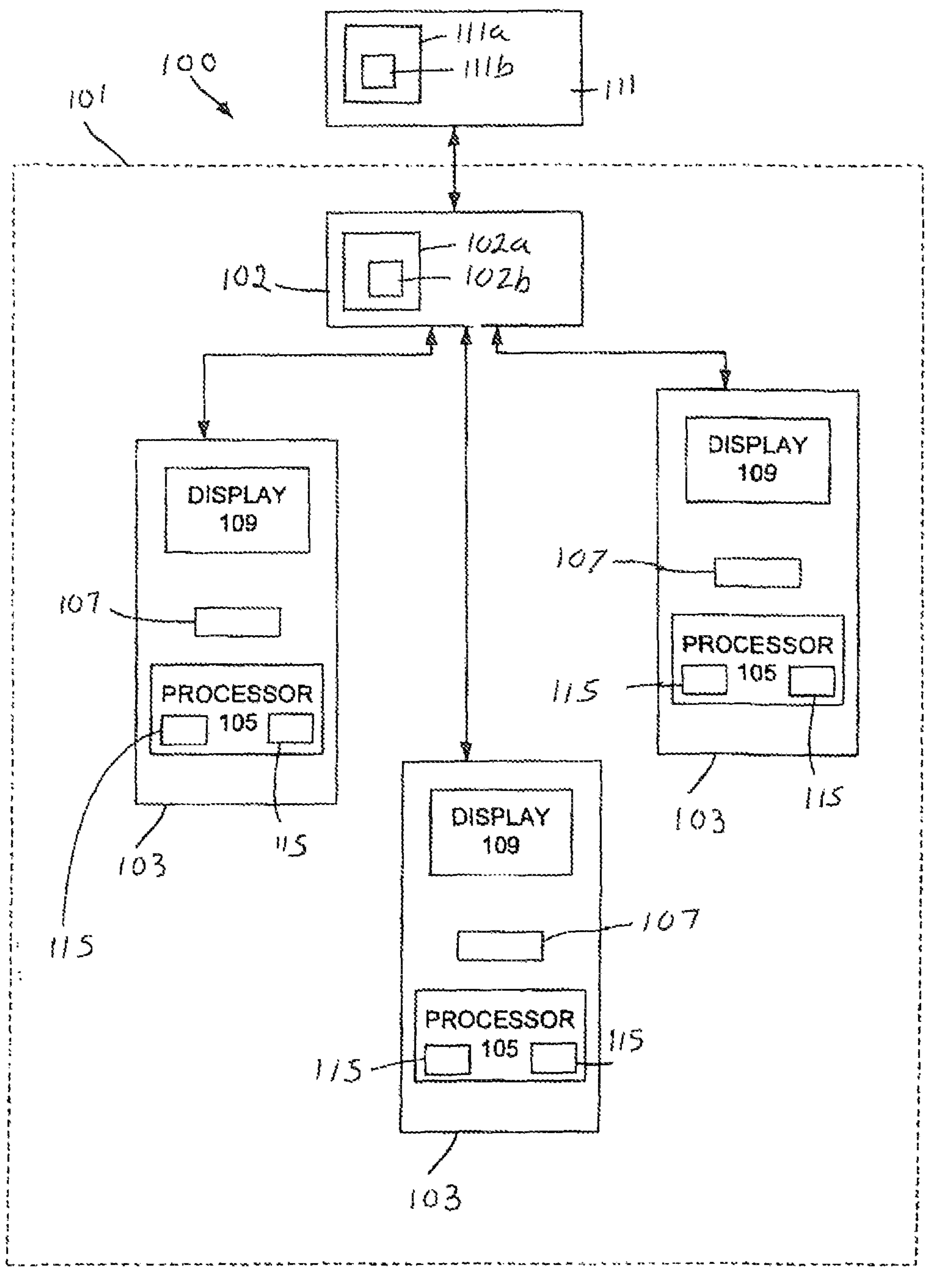
FIG. 1 is a functional block diagram of the video poker system of the present invention.

Referring to FIG. 1, one embodiment of a gaming system 100 for implementing the present invention is shown. The system 100 may enable multiple players to take part in a video poker game where the wager and payouts are paid to other players minus a rake from each game. The system 100 may run on a single gaming site/casino 101. Alternatively, the system 100 may run across multiple gaming sites/casinos 101. If the system 100 is run at a single gaming site/casino 101, the system 100 may include a local area server 102. The local area server 102 may be used to run the game on a plurality of gaming units 103. Alternatively, if multiple gaming sites 101 are included in the system 100, the system 100 may also include a central game server 111 to allow system wide communications, data collection, and control between or among gaming sites 101. The local area server 102 and the central game server 111 each include a processor 102*a* and 111*a* respectively. The processors 102*a* and 111*a* may be associated with memory 102*b* and 111*b* respectively which may be non-volatile memory, volatile memory, and/or both. The volatile and/or nonvolatile memory 102*b* and 111*b* may store computer program code that is executed by the processors 102*b* and 111*b* respectively to cause the processor to perform or direct the various functions for the gaming unit 103.

Each gaming unit 103 may include a processor 105 and a user interface arrangement including a player control arrangement 107 and a display device 109. The processor 105 may be associated with memory 115 which may be non-volatile memory, volatile memory, and/or both. The volatile and/or nonvolatile memory 115 may store computer program code that is executed by the processor 105 to cause the processor to perform or direct the various functions provided by the gaming unit 103. Each gaming unit 103 may further have a player input control 107. The player input control 107 may include various configurations of buttons, switches, pointing devices, and other devices that allow a player to make inputs during the course of a poker game. Display device 109 may include at least one video monitor/display such as a CRT, LCD, plasma, or other display device for displaying graphics in the course of game play. In particular, display device 109 displays various playing card representations as will be described in detail below. It will also be noted that player control functions may be integrated with display device 109 by using a touch screen display device. In these arrangements, the display screen itself, or more specifically, the touch sensitive film applied over the display screen and the controller associated with the touch-sensitive film, comprises part of player control arrangement 107.

Figure 2:
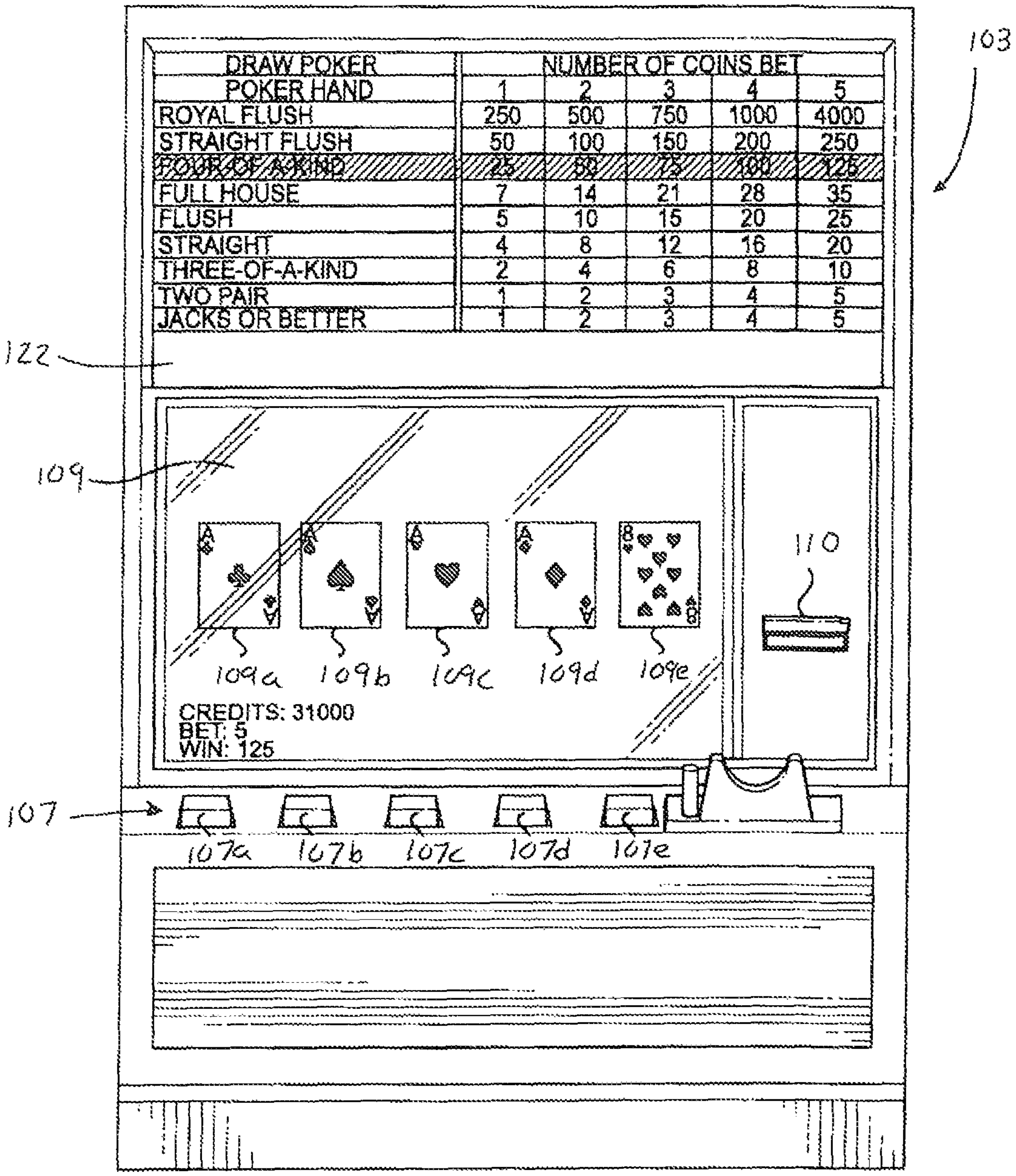
FIG. 2 is a front view of a video poker console.

Referring to FIG. 2, one embodiment of a gaming unit 103 is shown. The gaming unit 103 may be used for playing the video poker game of the present invention. The gaming unit 103 may have a display device 109. The display device 109 may be used for displaying cards or other symbols at positions 109*a*-109*e*. In the present embodiment, the player input control 107 is a set of buttons 107*a*-107*e*. The buttons 107*a*-107*e* may be used as input buttons to hold id/or discard the displaying cards or other symbols at positions 109*a*-109*e*. As stated above, it should be understood that different inputs may also be used. For example, the display device 109 may be a touch screen and buttons may appear on the display screen under card positions 109*a*-109*e* or otherwise proximate to card positions 109*a*-109*e*.

The gaming unit 103 may further have a wager/payout device 110 for accepting wagers and making payouts to players. The wager/payout device 110 is typically a note acceptor-dispenser that accepts and validates currency inserted by the player, and for dispensing currency to a player for unused credits that are either unplayed or won during a play session. The wager/payout device 110 may also be configured to print tickets for an amount of credit available to the player when he no longer desires to play the machine.

Figure 3:
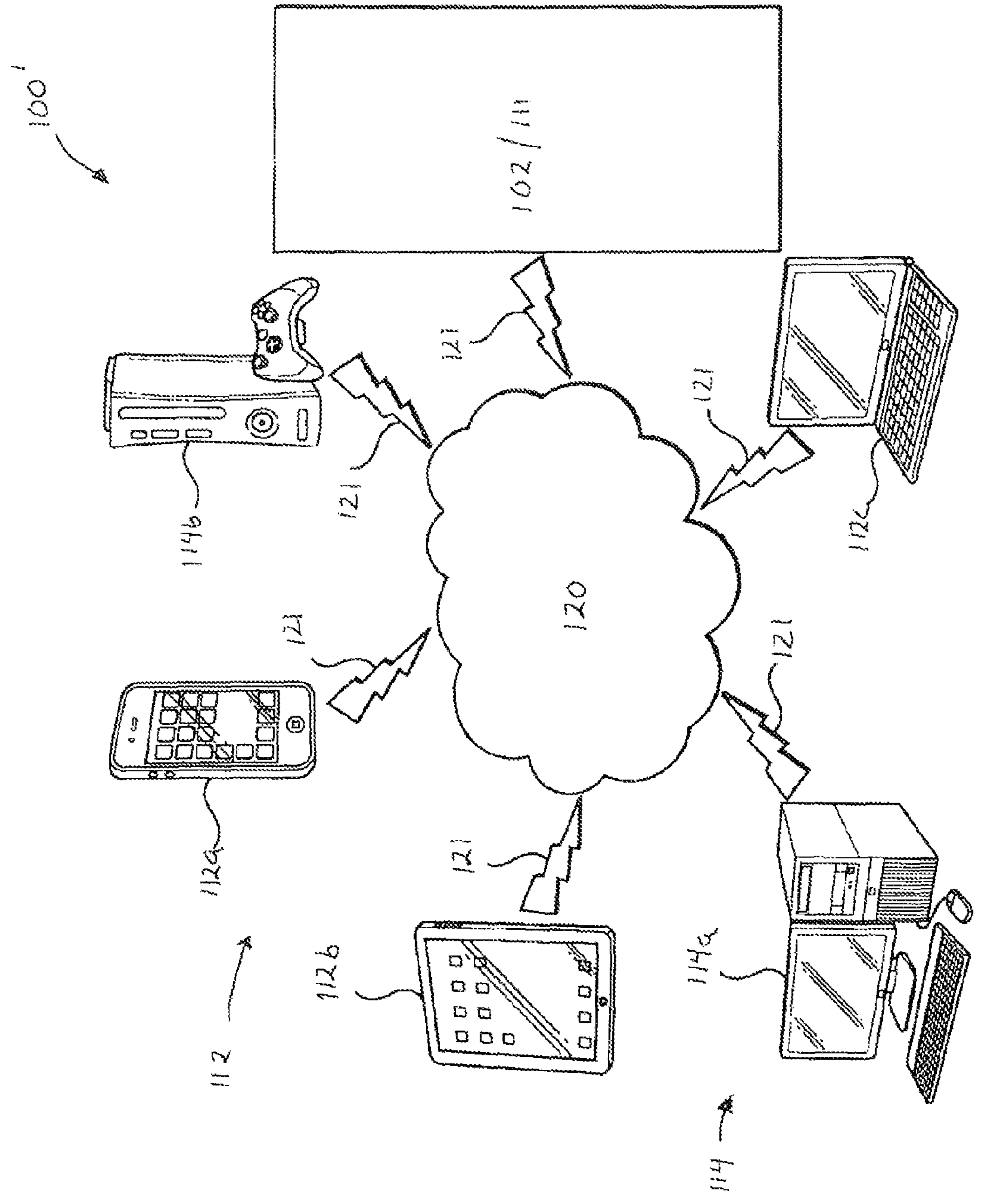
FIG. 3 is a functional block diagram of another embodiment of the video poker system of the present invention

Referring now to FIG. 3, another embodiment of a gaming system 100' for implementing the present invention is shown. The system 100' may enable multiple players to take part in a video poker game where the wager and payouts are paid to other players minus a rake from each game. The system 100' may be comprised of a plurality of mobile device 112. The mobile devices 112 may be a cellular phone 112A, a tablet 112B, a laptop 112C or the like. The system 100' may have other devices 114. These other devices 114 may include a desktop computer 114A, a gaming console 114B, or the like. The listing of the mobile devices 112 or other devices 114 is given as an example and should not be seen in a limiting manner. Any type of device may use the system 100' as long as the device has a connection 121 to access the network system 120. The network system 120 may be a local-area network (LAN), wide-area network (WAN) or the Internet. The connection 121 may be a wired connection, a wireless connection, or the like. The mobile devices 112 and/or other devices 114 may then access the local area server 102 or the central game server 111, which ever server may be used for hosting the poker game.

Figure 4:
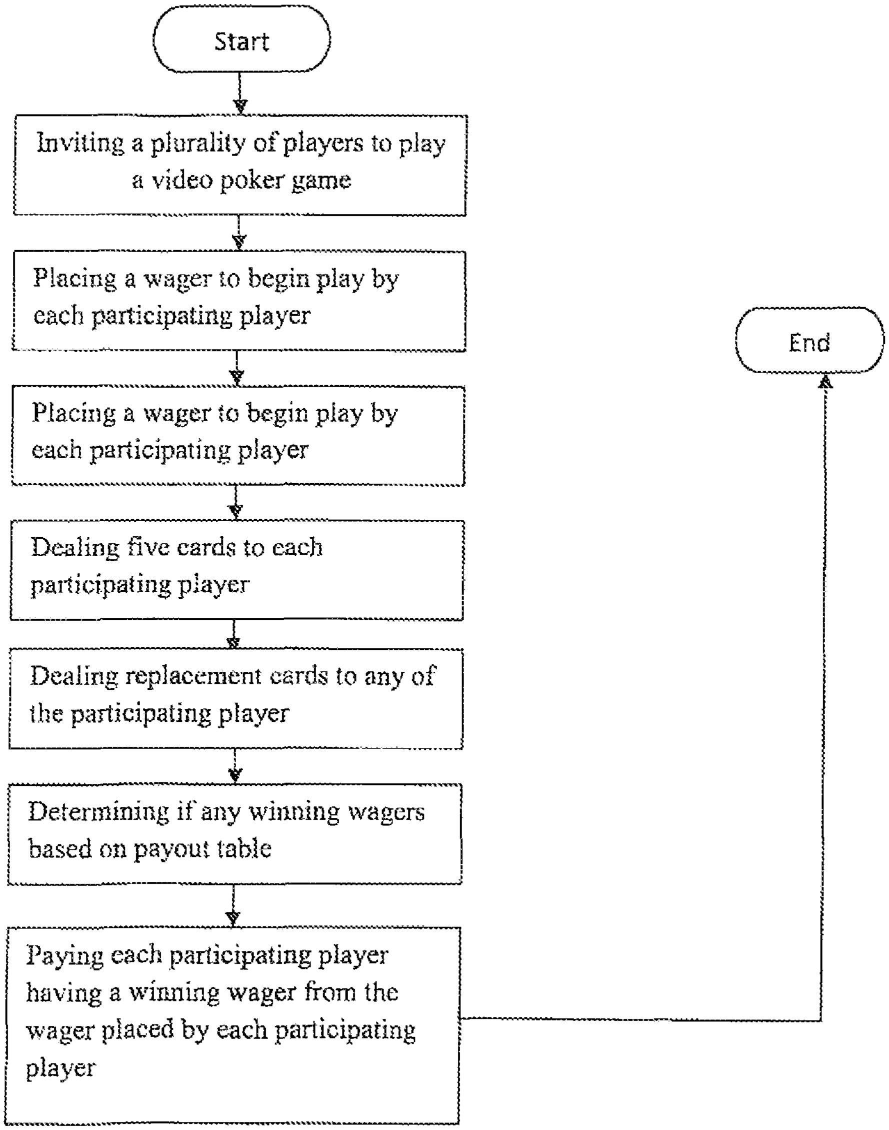
FIG. 4 is a flow chart showing operation of the video poker system of the present invention.

Referring now to FIG. 4, operation of the game will be disclosed. The operation of the game will be disclosed in regards to the system 100 of FIGS. 1 and 2. However, the game may be played on the system 100' as well. The poker game of the present invention allows players to play individual poker games on the player's respective gaming unit 103. However, the system 100 allows players to play with other players playing individual poker on their respective gaming unit 103 such that each participating player's individual hands are compared to a payout table 122. Each player with a winning hand is then paid from the opposing player and not from the house. The house may take a rake based on the wagers by the participating players.

The game may played with a standard deck of 52 cards per player. However, a plurality of standard decks may be used per player. The game may be played with any number of players. For the present example, we will use five players. On the gaming unit 103, each player may first enter playable credits by placing currency, player's card etc. into the wager/payout device 110. Once credits have been entered into the gaming unit 103, the participating player may be asked if the player wishes to play as an individual (like current video poker games) or if the player wishes to play against other players.

When playing against multiple players, each participating player in the game is required to place a participation wager. The participation wager should be the exact same amount for each player and each participating player may be shown the exact same payout table 122 on their respective gaming unit 103 based on their respective poker hands. A rake may be taken by the house based on the amount wagered.

Once the participation wager is placed by each participating player, each player will receive five cards from their own 52 card standard deck of cards. The five cards is generally displayed face up on the player's respective display device 109 on the gaming unit 103. Each participating player may then be asked to hold or replace each of the five cards to make the best possible poker hand. Each player may use buttons 107*a*-107*e* to hold and/or discard respective cards at positions 109*a*-109*e*. If a player elects to replace one, two, three, four or five cards, an additional card or cards will be dealt face up to the player to replace each card replaced from their own 52 card deck to form a final hand. If the player elects not to replace any cards the player is opting to play the original five cards dealt as the final hand.

If the five remaining cards, the final hand, make a poker hand that matches a poker hand on the payout table 122, that player will receive the payout corresponding to that poker hand minus any payouts owed to any other remaining player. The payout will come from the pot, wherein the pot may be defined as all player wagers by the player minus the rake, and if the pot does not cover the total payoff amount, the remaining amount may be paid by the other four players proportionally based on the payout amount of the winner's player hand. If a player has a hand not on the payout table 122 and loses, his wager is paid proportionally to the other four players who have not folded.

The following would be a sample pay table of winning poker hands: Royal Flush 250, Straight Flush 50, Four of a Kind, 25, Full House 7, Flush 5, Straight 4, Three of a Kind 2, Two Pair 1 and Jacks or Better 1. The payout odds and possible winning hands listed are given as an example and should not be seen as to limit the scope of the present invention. In addition, the payout structure could include progressive pots. These progressive pots could be funded by a percentage of the initial wager by each player or a side bet. In addition, the house could fund payouts on certain hands by a promotion. The rake percentage could be any percentage amount that will be determined by the operator.

The game would be played as follows. Each participating player places a participation wager of $1.00. In the present example, there will be five participating player. Thus a total of $5.00 is placed in the pot. Player 1 receives the following five cards from his 52 card deck: Ace of hearts, jack of hearts, seven of hearts, six of hearts and two of clubs. Player 1 holds the first four cards and replaces the fifth card, the two of clubs, Player 1 receives the two of hearts as his replaced card making a flush. Player 1 would win $5.00 for the flush hand. Player 2 is dealt a Jack of Hearts, King of Diamonds, Three of Spades, Two of Clubs and Nine of Hearts. Player 2 decides to fold and loses his initial $1.00 wager to the pot. Player 3, Player 4 and Player 5 decided to continue playing the game but don't make a winning hand based on the payout table. As a result, Player 3, Player 4 and Player 5 would lose their wager bet and be responsible for paying Player 1 a proportion of the value of the $5.00. For illustration purposes, the rake percentage will be 10%.

| | Player 1 | Player 2 | Player 3 | Player 4 | Player 5 |
|---|---|---|---|---|---|
| Wager: | $1.00 | $1.00 | $1.00 | $1.00 | $1.00 |
| Total Pot | | | $5.00 | | |
| House rake equals 10%: | | | $0.50 | | |
| Total Remaining Pot: | | | $4.50 | | |
| Payout winners: | P1 $5.00 | P2 $0.00 | P3 $0.00 | P4 $0.00 | P5 $0.00 |

Since the total payout to P1 exceed the total remaining pot, each remaining player, i.e., players that have not folded (P3, P4 and P5), may be responsible for paying Player 1 the remaining proportion of the payout. In the present example, since P1 won $5.00, but the total remaining pot is only $4.50; P3, P4 and P5 will evenly pay the remaining $0.50 to P1. Thus, P3, P4 and P5, will each pay $0.17. The amount paid off per player may be paid from each player credits.

Thus, for the above hand, P1 wins $5.01, P2 loses $1.00, P3 loses $1.17, P4 loses $1.17, and P5 loses $1.17. Please note P 2 lost the least amount because P2 folded, therefore, Player 2 loss was capped at $1.00. If only one player remains, i.e. P2, P3, P4 and P5 had folded, the remaining payout, $0.50 may be paid by the house.

If the total payout to each winning player is less than the total remaining pot, each remaining player, i.e., players that have not folded, may equally divide the remaining pot. Thus, in the above example, if P1 only had a winning had of Jacks or better, P1 would win $1.00. After paying P1, the remaining pot would be $3.50 which would be equally divided among P3, P4, and P5.

In accordance with another embodiment, the above could be played wherein a participating player cannot fold. Thus, once the participation wager is placed by each participating player, each player will receive five cards from their own 52 card standard deck of cards. Each participating player must then either hold or replace one or more of the participating player's cards. The participating player cannot fold.

In addition, the game could be played by each player requesting to play a multi hand version of the game. In this example, four players desire to play against each other. If all the players select to play a three hand multi version of the game, the player would make a $1.00 wager per hand, $3.00 per player for a total of $12.00. Player 1 would receive five cards exposed from a standard 52 card deck in his/her first hand, the same five cards exposed would be dealt in the second and third hand from a different 52 card deck for each hand. Therefore, there would be three separate 52 cards decks used per player. In this example the five cards are a jack of diamonds, three of spades, four of hearts, nine of clubs and two of spades. These exact same five cards would be dealt from the three 52 cards decks and exposed to the player. The player then would select to hold or replace the five cards. In this example, Player 1 selects to hold only the jack of diamonds and replace the other four cards. Therefore, the dealer would deal four cards from each standard 52 card decks. The results are as follows with a rake percentage set at 10% for purposes of this example:

Original Hand

Hand 1: Jack of Diamonds, Three of Spades, Four of Hearts, Nine of Clubs and Two of Spades Hand 2: Jack of Diamonds, Three of Spades, Four of Hearts, Nine of Clubs and Two of Spades Hand 3: Jack of Diamonds, Three of Spades. Four of Hearts, Nine of Clubs and Two of Spades Player 1 elects to hold only the Jack of Diamonds and draws four new cards for each hand. After the draw, each hand is now as follows:

Hand 1: Jack of Diamonds, Ten of Clubs, Nine of Hearts, Ace of Clubs, King of Spades Hand 2: Jack of Diamonds, Six of Clubs, Six of Spades, Queen of Spades, Three of Clubs Hand 3: Jack of Diamonds, Three of Clubs, Jack of Clubs, Ace of Clubs, Jack of Hearts Player 1 wins on Hand 3, Three dollars for having Three of a Kind based on the payout stated above. Again the payout odds and amount wagered are given as an example and should not be seen as to limit the scope of the present invention.

Player 2, Player 3 and Player 4 are each dealt three losing hands the payout would be as follows:

| | Player 1 | Player 2 | Player 3 | Player 4 |
|---|---|---|---|---|
| Wager | $3.00 | $3.00 | $3.00 | $3.00 |
| Total Pot | | $12.00 | | |
| House rake equals | | 10% or $1.20 | | |
| Total remaining pot | | $10.80 | | |
| Payout winners: | P1 $3.00 | P2 $0.00 | P3 $0.00 | P4 $0.00 |

The remaining pot after the payout to Player 1 is $7.80. The payout of the remaining pot is as follows:

P1 $1.95 P2 $1.95 P3 $1.95 P4 $1.95

Thus, the final winnings for each player is as follows wherein ($) indicates a loss is as follows:

P1 $4.95 P2 ($1.05) P3 ($1.05) P4 ($1.05)

It should be noted that this invention should not be limited in scope by one hand per player, three hands, five hands, ten hands or one hundred hands per player.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer implemented video poker card game, the computer comprising a visual display device and a processor operably coupled to the display device and combined to display a card game, the processor programmed for a method comprising:

inviting a plurality of players to play a video poker game, wherein each participating player plays an individual hand dealt from a separate standard 52 card deck for that participating player;

placing a wager to begin play by each participating player, wherein there is at least two participating players;

dealing five cards to each participating player face up from the separate standard 52 card deck for that participating player, wherein each participating player may one of: hold, fold, or replace any of the five cards;

dealing replacement cards to each participating player from the separate standard 52 card deck for that participating player for each participating player who selects to replace any of the five card dealt to that participating player;

determining if any of the participating players has a winning wager by verifying if remaining five cards of each participating player matches a poker hand stated on a pay table; and paying each participating player having a winning wager from the wager placed by each participating player after a rake is taken from the wager placed by each participating player by an organizer.

2. The method of claim 1, wherein paying each participating player having a winning wager from the wager placed by each participating player further comprises paying a proportional share of the winning wager by each remaining participating player having a non-winning wager when the wager placed by each participating is insufficient to cover the winning wager.

3. The method of claim 1, wherein paying each participating player having a winning wager from the wager placed by each participating player further comprises equally dividing the wager placed by each participating player when the wager placed by each participating player exceeds all winning wagers combined.

4. The method of claim 1, further comprising placing a bonus wager before dealing five cards for a progressive bonus.

5. The method of claim 1, further comprising placing a portion of the participation wager for a progressive bonus.

6. A game server comprising:

at least one processor; and a memory operatively coupled to the at least one processor, the memory storing program instructions that when executed by the at least one processor causes the at least one processor to perform a method comprising:

inviting a plurality of players to play a video poker game, wherein each participating player plays an individual hand dealt from a separate standard 52 card deck for that participating player;

placing a wager to begin play by each participating player, wherein there is at least two participating players;

dealing five cards to each participating player face up from the separate standard 52 card deck for that participating player, wherein each participating player may one of: hold, fold, or replace any of the five cards;

dealing replacement cards to each participating player from the separate standard 52 card deck for that participating player for each participating player who selects to replace any of the five card dealt to that participating player;

determining if any of the participating players has a winning wager by verifying if remaining five cards of each participating player matches a poker hand stated on a pay table; and paying each participating player having a winning wager from the wager placed by each participating player after a rake is taken from the wager placed by each participating player by an organizer.

7. The method of claim 6, wherein paying each participating player having a winning wager from the wager placed by each participating player further comprises paying a proportional share of the winning wager by each remaining participating player having a non-winning wager when the wager placed by each participating is insufficient to cover the winning wager.

8. The method of claim 6, wherein paying each participating player having a winning wager from the wager placed by each participating player further comprises equally dividing the wager placed by each participating player when the wager placed by each participating player exceeds all winning wagers combined.

9. The method of claim 6, further comprising placing a bonus wager before dealing five cards for a progressive bonus.

10. The method of claim 6, further comprising placing a portion of the participation wager for a progressive bonus.

11. A method for playing a video poker game comprising:

inviting a plurality of players to play the video poker game, wherein each participating player plays an individual hand dealt from a separate standard 52 card deck for that participating player;

placing a wager to begin play by each participating player, wherein there is at least two participating players;

dealing five cards to each participating player face up from the separate standard 52 card deck for that participating player, wherein each participating player may one of: hold, fold, or replace any of the five cards;

dealing replacement cards to each participating player from the separate standard 52 card deck for that participating player for each participating player who selects to replace any of the five card dealt to that participating player;

determining if any of the participating players has a winning wager by verifying if remaining five cards of each participating player matches a poker hand stated on a pay table; and paying each participating player having a winning wager from the wager placed by each participating player after a rake is taken from the wager placed by each participating player by an organizer.

12. The method of claim 11, wherein paying each participating player having a winning wager from the wager placed by each participating player further comprises paying a proportional share of the winning wager by each remaining participating player having a non-winning wager when the wager placed by each participating is insufficient to cover the winning wager.

13. The method of claim 11, wherein paying each participating player having a winning wager from the wager placed by each participating player further comprises equally dividing the wager placed by each participating player when the wager placed by each participating player exceeds all winning wagers combined.

14. The method of claim 11, further comprising placing a bonus wager before dealing five cards for a progressive bonus.

15. The method of claim 11, further comprising placing a portion of the participation wager for a progressive bonus.

* * * * *